United States Patent
Kortge

(10) Patent No.: US 7,353,788 B2
(45) Date of Patent: Apr. 8, 2008

(54) FUZZY LOGIC BASED CAM PHASER CONTROL

(75) Inventor: Jerry William Kortge, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 18 days.

(21) Appl. No.: 11/218,850

(22) Filed: Sep. 2, 2005

(65) Prior Publication Data

US 2007/0051328 A1    Mar. 8, 2007

(51) Int. Cl.
    *F01L 1/34*    (2006.01)
(52) U.S. Cl. .............................. 123/90.17; 123/90.15; 701/102; 701/105; 701/106; 701/115; 706/3; 706/4; 706/900
(58) Field of Classification Search .............. 123/90.17
See application file for complete search history.

(56) References Cited

U.S. PATENT DOCUMENTS 5,937,806 A * 8/1999 Lyko et al. ............... 123/90.15
6,760,658 B2 * 7/2004 Yasui et al. ................. 701/106
7,059,285 B2 * 6/2006 Schafer et al. ........... 123/90.15

FOREIGN PATENT DOCUMENTS

WO    WO 2004007919 A1 *    1/2004

* cited by examiner

*Primary Examiner*—Thomas Denion
*Assistant Examiner*—Kyle M. Riddle

(57) ABSTRACT

A method of controlling a valve of a cam phaser of an internal combustion engine includes determining a delta duty cycle from a position error and a rate of change of error (error dot). A fuzzy gain value is calculated from the delta duty cycle and a correction term. A duty cycle is calculated from an integral gain value and the fuzzy gain value. The duty cycle is then used to control the valve of the cam phaser.

16 Claims, 6 Drawing Sheets

| 1. | IF | Position Error is Negative Medium | AND | Error Dot is Negative Medium |
|---|---|---|---|---|
| | THEN | Delta DC is Negative Large. | | |
| 2. | IF | Position Error is Negative Medium | AND | Error Dot is Negative Small |
| | THEN | Delta DC is Negative Large. | | |
| 3. | IF | Position Error is Negative Medium | AND | Error Dot is Zero |
| | THEN | Delta DC is Negative Medium. | | |
| 4. | IF | Position Error is Negative Medium | AND | Error Dot is Positive Small |
| | THEN | Delta DC is Negative Small. | | |
| 5. | IF | Position Error is Negative Medium | AND | Error Dot is Positive Medium |
| | THEN | Delta DC is Zero. | | |
| 6. | IF | Position Error is Negative Small | AND | Error Dot is Negative Medium |
| | THEN | Delta DC is Negative Large. | | |
| 7. | IF | Position Error is Negative Small | AND | Error Dot is Negative Small |
| | THEN | Delta DC is Negative Medium. | | |
| 8. | IF | Position Error is Negative Small | AND | Error Dot is Zero |
| | THEN | Delta DC is Negative Small. | | |
| 9. | IF | Position Error is Negative Small | AND | Error Dot is Positive Small |
| | THEN | Delta DC is Negative Zero. | | |
| 10. | IF | Position Error is Negative Small | AND | Error Dot is Positive Medium |
| | THEN | Delta DC is Positive Small. | | |
| 11. | IF | Position Error is Zero | AND | Error Dot is Negative Medium |
| | THEN | Delta DC is Negative Medium. | | |
| 12. | IF | Position Error is Zero | AND | Error Dot is Negative Small |
| | THEN | Delta DC is Negative Small. | | |
| 13. | IF | Position Error is Zero | AND | Error Dot is Zero |
| | THEN | Delta DC is Zero. | | |
| 14. | IF | Position Error is Zero | AND | Error Dot is Positive Small |
| | THEN | Delta DC is Positive Small. | | |
| 15. | IF | Position Error is Zero | AND | Error Dot is Positive Medium |
| | THEN | Delta DC is Positive Small | | |
| 16. | IF | Position Error is Positive Small | AND | Error Dot is Negative Medium |
| | THEN | Delta DC is Negative Small. | | |
| 17. | IF | Position Error is Positive Small | AND | Error Dot is Negative Small |
| | THEN | Delta DC is Zero. | | |
| 18. | IF | Position Error is Positive Small | AND | Error Dot is Zero |
| | THEN | Delta DC is Positive Small. | | |
| 19. | IF | Position Error is Positive Small | AND | Error Dot is Positive Small |
| | THEN | Delta DC is Positive Small. | | |
| 20. | IF | Position Error is Positive Small | AND | Error Dot is Positive Medium |
| | THEN | Delta DC is Positive Large. | | |
| 21. | IF | Position Error is Positive Medium | AND | Error Dot is Negative Medium |
| | THEN | Delta DC is Zero. | | |
| 22. | IF | Position Error is Positive Medium | AND | Error Dot is Negative Small |
| | THEN | Delta DC is Positive Small. | | |
| 23. | IF | Position Error is Positive Medium | AND | Error Dot is Zero |
| | THEN | Delta DC is Positive Small. | | |
| 24. | IF | Position Error is Positive Medium | AND | Error Dot is Positive Small |
| | THEN | Delta DC is Positive Large. | | |
| 25. | IF | Position Error is Positive Medium | AND | Error Dot is Positive Medium |
| | THEN | Delta DC is Positive Large. | | |
| 26. | IF | |Position Error| > Positive Medium | | |
| | THEN | Delta DC is Fuzzy Delta DC for Positive Medium * scaler f(error sign). | | |

*Figure 4*

FUZZY LOGIC BASED CAM PHASER CONTROL

FIELD OF THE INVENTION

The present invention relates to cam phasers for internal combustion engines, more particularly to systems and methods for controlling the actuation of cam phasers using fuzzy logic.

BACKGROUND OF THE INVENTION

Cam phasers vary the valve timing of internal combustion engines and may help reduce nitrogen oxides (NOX) and other emissions such as unburned hydrocarbons. Cam phasers also help improve fuel economy and/or increase engine torque at various speeds. Multiple cam phasers may be used to actuate intake and exhaust valves on an internal combustion engine.

A phaser typically comprises a rotor element that is attached to the end of a camshaft and is variably displaceable rotationally within a stator element driven by the engine crankshaft. Cam phasers are typically actuated by pressurized oil from the engine's main oil supply. The oil is selectively directed by electronically controlled valving to chambers within the phaser. The direction of the oil alters the phase relationship between the rotor and stator, and, hence, between the camshaft and crankshaft.

A current method of controlling cam phasers employs a traditional proportional and integral (PI) gains calculation for each phaser. Although widely used, this calculation is still susceptible to overshoot and undershoot. Furthermore, this method of calculation requires a substantial amount of controller memory and processing capacity. Moreover, the PI gain calculation increases the complexity of calibrations used to control the cam phaser.

SUMMARY OF THE INVENTION

A method of controlling a valve of a cam phaser of an internal combustion engine includes determining a delta duty cycle from a position error and rate of change of error (error dot). A fuzzy gain value is calculated from the delta duty cycle and a correction term. A duty cycle is calculated from an integral gain value and the fuzzy gain value. The duty cycle is used to control the valve of the cam phaser.

In one feature, the method further includes calculating the correction term based on engine oil temperature and engine speed.

In another feature, the step of calculating a fuzzy gain value further includes multiplying the delta duty cycle by a first selectable scalar value if an absolute value of the position error is greater than a second selectable scalar value.

In another feature, the method further includes calculating the position error from a desired cam phaser position and a measured cam phaser position.

In still another feature, the method further includes calculating the error dot from the position error and a previous position error, wherein the position error and the error dot can be at least one of negative medium, negative small, zero, positive small, and positive medium.

In still another feature, the step of controlling the valve further includes converting the duty cycle value to a signal and controlling the valve based on the signal, wherein the signal is a pulse width modulated signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a table listing fuzzy logic rules used to determine a delta duty cycle value;

DETAILED DESCRIPTION OF THE PREFERRED EMBODIMENTS

Figure 1:
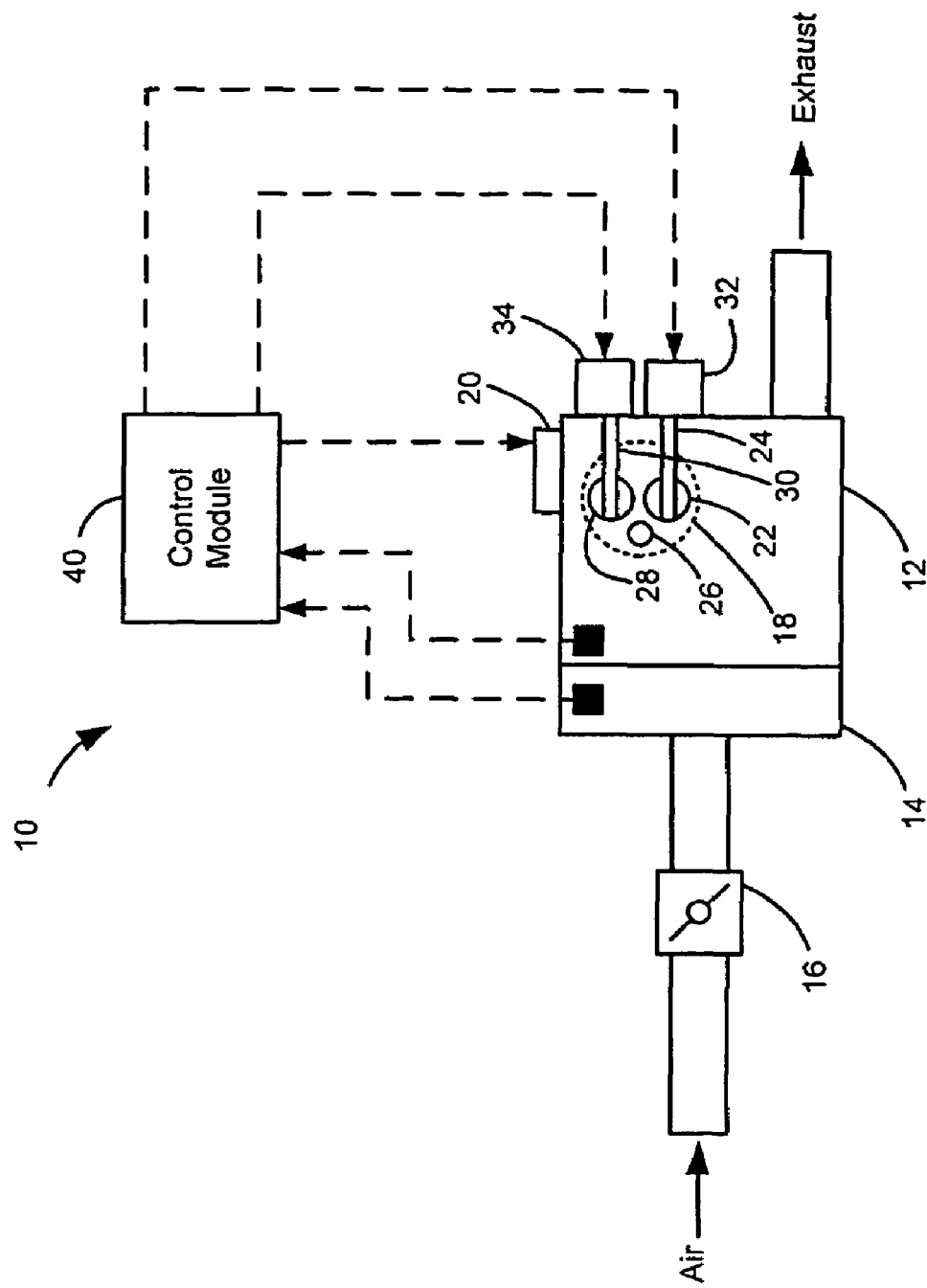
FIG. 1 is a functional block diagram illustrating a vehicle engine system including a cam phaser and control module according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it is appreciated that the engine control system of the present invention can be implemented in engines having a plurality of cylinders including, but not limited to, 2, 3, 4, 5, 6, 8, 10 and 12 cylinders.

A fuel injector (not shown) injects fuel which is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque.

Combustion exhaust within the cylinder 18 is forced out an exhaust port when an exhaust valve 28 is in an open position. The exhaust valve position is regulated by an exhaust camshaft 30. The exhaust is treated in an exhaust system. Although single intake and exhaust valves 22,28 are illustrated, it can be appreciated that the engine 12 can include multiple intake and exhaust valves 22,28 per cylinder 18.

The engine system 10 can include an intake cam phaser 32 and an exhaust cam phaser 34 that respectively regulate the rotational timing of the intake and exhaust camshafts 24,30. More specifically, the timing or phase angle of the respective intake and exhaust camshafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

Figure 2:
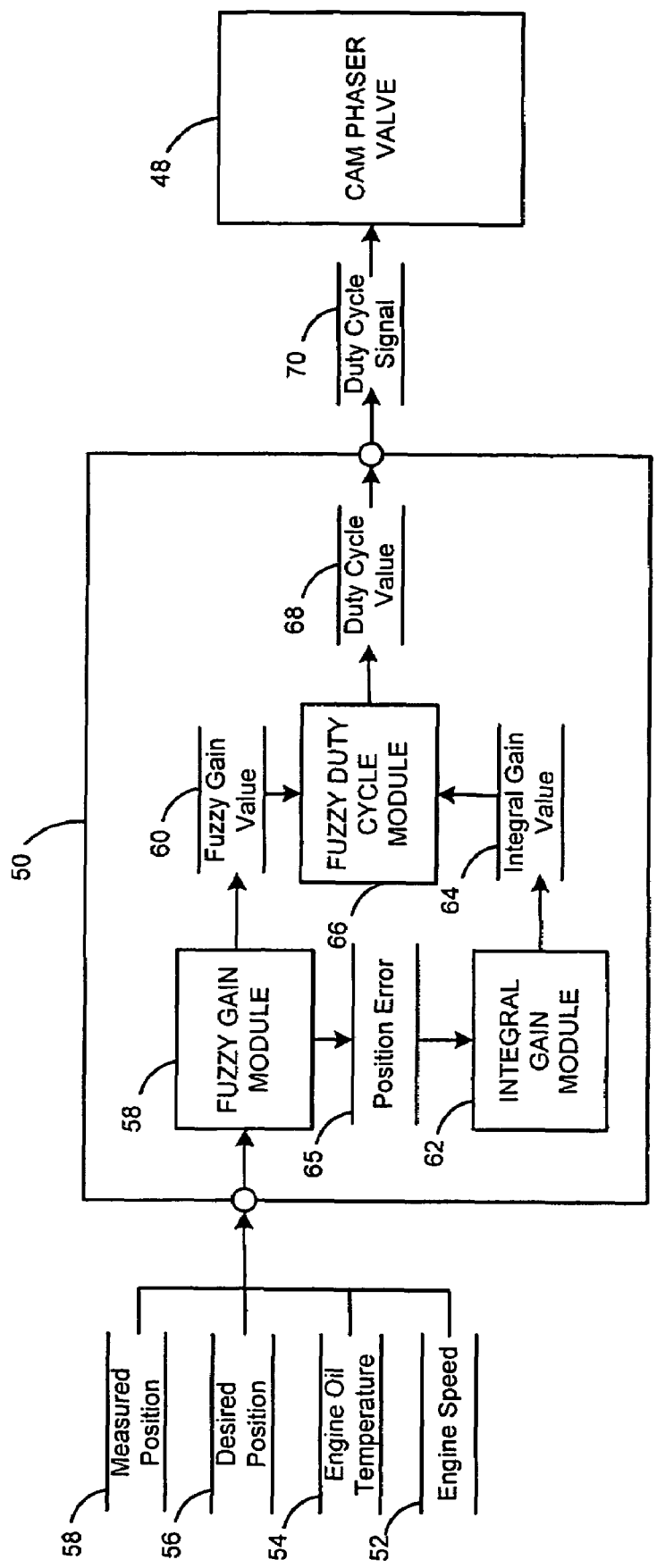
FIG. 2 is a data flow diagram illustrating a cam phaser control module according to the present invention.

A control module 40 controls a valve of the intake cam phaser 32 and/or exhaust cam phaser 34 based on a fuzzy logic calculation according to the present invention. Referring now to FIG. 2, a subsystem of the control module responsible for controlling a valve 48 of a cam phaser is shown at 50. The cam phaser control module 50 receives the following inputs either sensed from the engine or determined by other modules of the control module 40 (FIG. 1): engine speed in revolutions per minute (RPM) 52, engine oil temperature in degrees Celsius 54, desired cam position in degrees 56, and measured cam position in degrees 58. A fuzzy gain module 59 receives the inputs and calculates a fuzzy gain value 60 using fuzzy logic. An integral gain module 62 determines an integral gain value 64 from a position error value 65 received from fuzzy gain module 59.

A fuzzy duty cycle module 66 receives the fuzzy gain value 60 from fuzzy gain module 59 and the integral gain value 64 from integral gain module 62. Fuzzy duty cycle module 66 calculates a duty cycle value 68 by adding the fuzzy gain value 60 with the integral gain value 64. The duty cycle value is converted to a signal 70 and commanded as output from the cam phaser control module 50. The signal can be capable of commanding a variable current for a fixed impedance. In the preferred embodiment, the duty cycle signal is a pulse width modulated signal. A valve 48 of the intake cam phaser and/or exhaust cam phaser receives the duty cycle signal 70. Based on the signal received, pressurized oil is provided by the valve to the cam phaser as needed to alter timing of the intake valves by retarding or advancing their angular position relative to the phase angle of the camshaft.

Fuzzy logic is defined as a superset of Boolean, or classical, logic dealing with the concept of partial truth. While in Boolean logic everything can be expressed in binary terms (0 or 1, on or off, yes or no), fuzzy logic replaces classical truth values with degrees of truth that range between 0 and 1. The present invention applies the concepts of fuzzy logic by replacing calculated error values with degrees of error in order to control the gain values of a cam phaser duty cycle signal.

Figure 3:
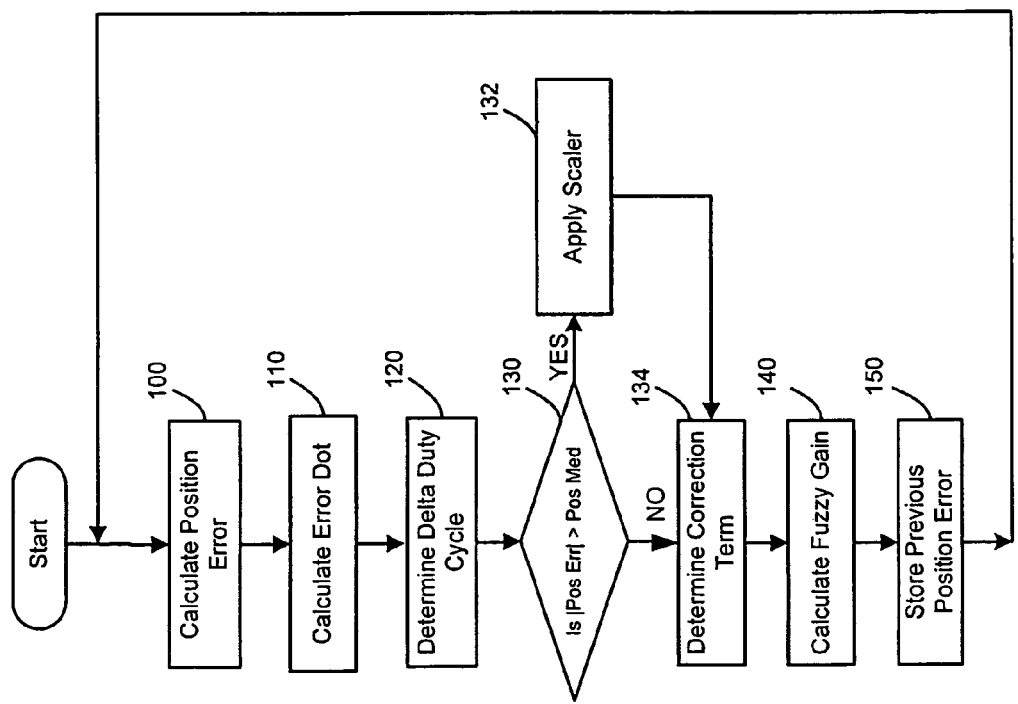
FIG. 3 is a flowchart illustrating the flow of control for the fuzzy gain module of the present teachings.

Referring now to FIG. 3, the steps performed by the fuzzy gain module 59 will be discussed in detail. In step 100, control calculates a position error based on the difference between a desired cam phaser position 56 (FIG. 2) and a measured cam phaser position 58 (FIG. 2). The position error can be classified by the degree of error and represented as negative medium, negative small, zero, positive small, or positive medium. In the preferred embodiment, the position error can range from negative six to positive six. In step 110, control determines an error dot otherwise known as an error rate-of-change, based on the current position error and a previous position error. The error dot can be classified as the degree of the rate-of-change and be represented as negative medium, negative small, zero, positive small, or positive medium. In the preferred embodiment, the error dot can range from negative six to positive six.

In step 120, a delta duty cycle is determined as a function of position error and error dot. The delta duty cycle can be classified as the degree of duty cycle and be represented as negative large, negative medium, negative small, zero, positive small, or positive medium. A set of rules according to fuzzy logic governs the determination of the delta duty cycle. Turning now to FIG. 4, a table listing the set of fuzzy rules in an if-then format is shown. For example, the first entry of the table reads, IF the position error is negative medium and the error dot is negative medium, THEN the delta duty cycle value is negative large. An additional rule 26 is provided when the absolute value of the position error is large. In the preferred embodiment, the absolute value of the position error is deemed large when it is greater than a predetermined value such as six. In this case, a delta duty cycle for positive medium (negative medium) is multiplied by a scalar value. The scalar value can be selected from a range between one and ten.

As shown in FIG. 3, step 130 determines whether the position error is greater than the positive medium. If yes, a scalar is selected and applied to the delta duty cycle in 132. If no, control flows to step 134 determine correction term. In step 134, a correction term value derived from the engine speed input 52 (FIG. 2) and the engine oil temperature input 54 (FIG. 2) is then applied to the delta duty cycle. In step 140, the delta duty cycle value is then multiplied by the correction term value and equated to a fuzzy gain value 60 (FIG. 2) in duty cycle. In step 150, the position error is stored as a previous position error before control loops back to the beginning of the process.

Figure 5:
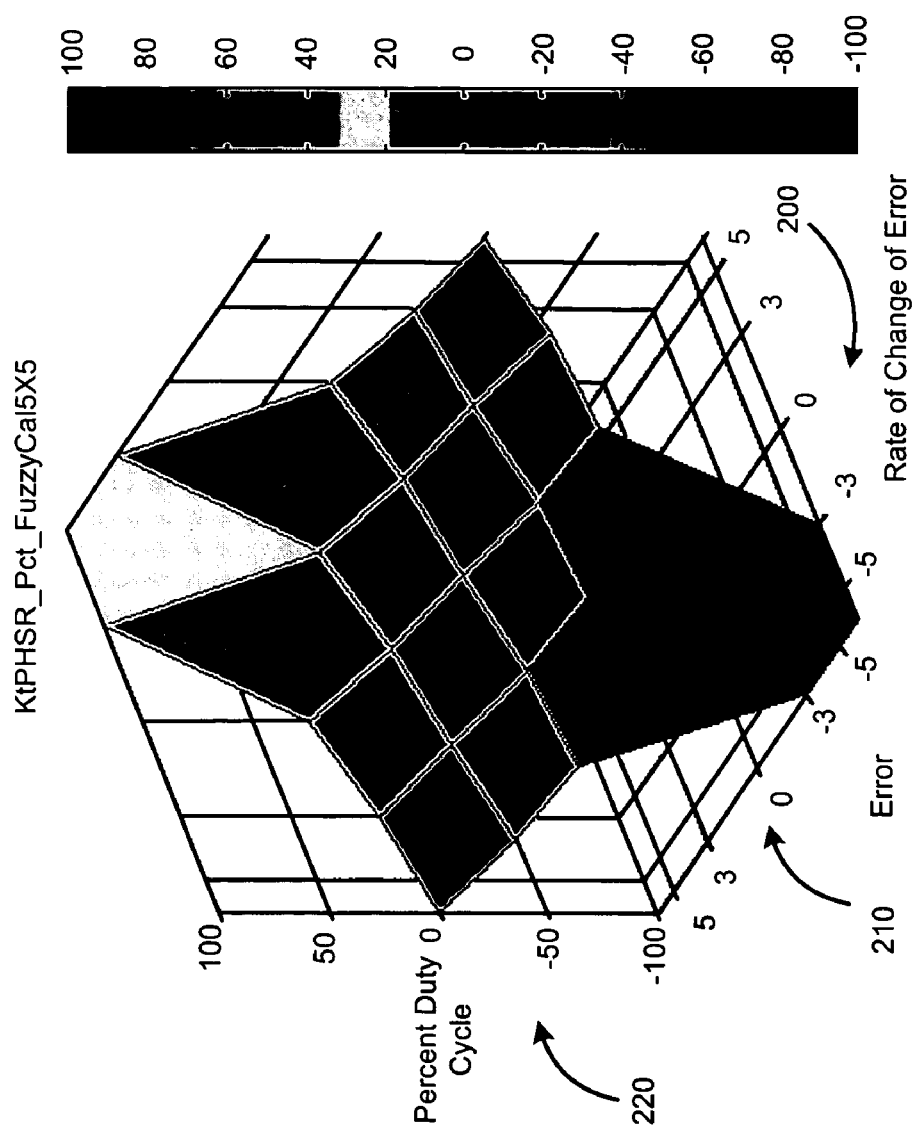
FIG. 5 is a three-dimensional graph illustrating the determination of a delta duty cycle as a function of position error and error dot.

Referring now to FIG. 5, a three-dimensional graphical representation of the determined delta duty cycle as defined by the rules of FIG. 4 is portrayed as a function of position error and error dot. Error dot values are plotted along the x-axis at 200. In this example, the error dot can range from negative six to positive six. In the preferred embodiment, the error dot range can be selectable. Position error values are plotted along the y-axis at 210, ranging from negative six to positive six. In the preferred embodiment, the position error range can be selectable. Delta duty cycle values are plotted along the z-axis at 220 ranging from negative one hundred to positive one hundred percent.

Figure 6:
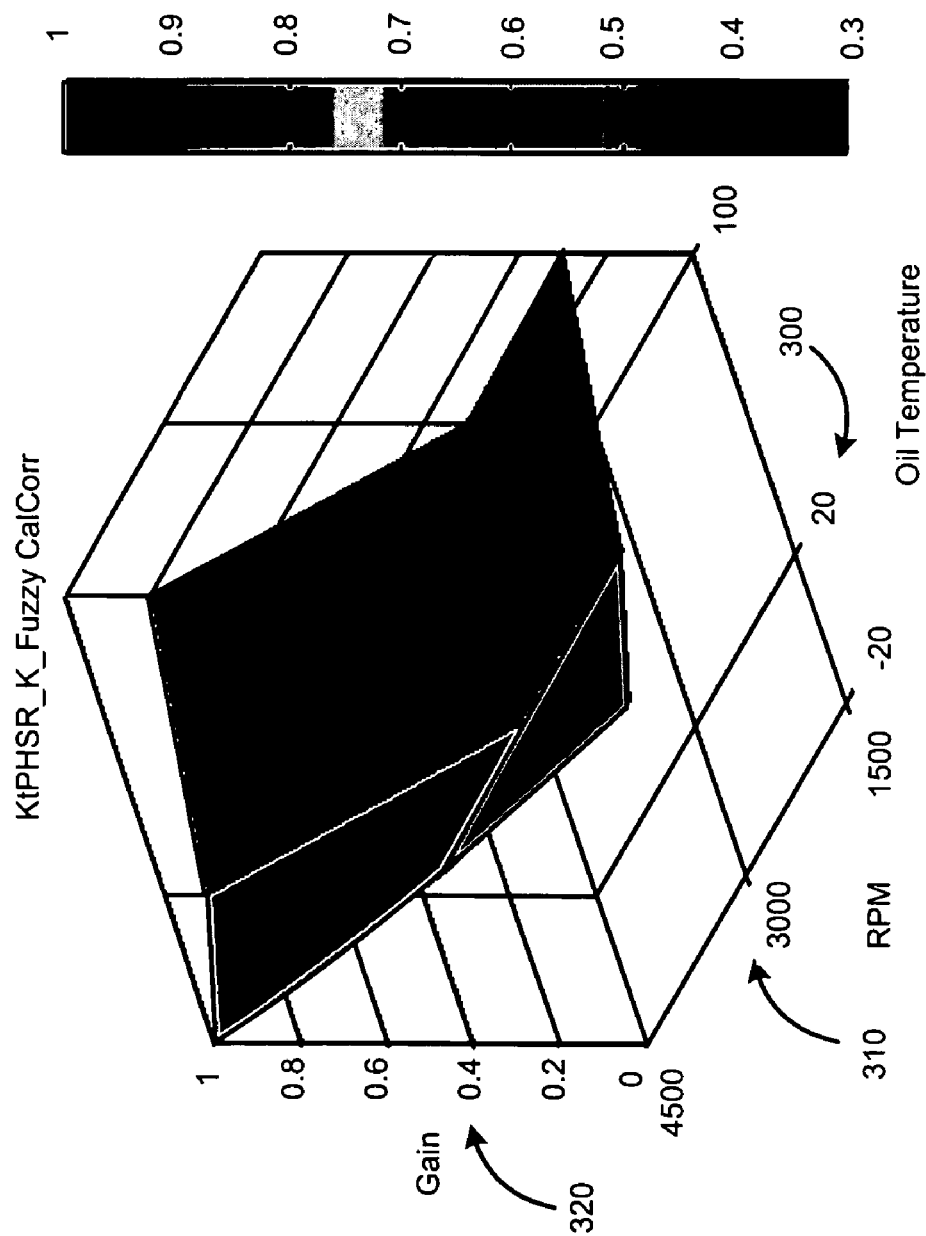
FIG. 6 is a three-dimensional graph illustrating the determination of a correction term as a function of an engine speed and an engine oil temperature.

In FIG. 6, a three-dimensional graphical representation of the determined correction term as a function of engine oil temperature and engine speed is shown. Engine oil temperature values are plotted along the x-axis at 300. In this example, the engine oil temperature can range from negative twenty to positive one hundred degrees Celsius. In the preferred embodiment, the engine oil temperature range can be selectable. Engine speed values are plotted along the y-axis at 310 ranging from positive fifteen hundred to positive forty-five hundred revolutions per minute. In the preferred embodiment, the engine speed range can be selectable. Correction term values are plotted along the z-axis at 320 ranging from zero to positive one.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of controlling a valve of a cam phaser, comprising:
   determining a delta duty cycle from a position error and an error dot;
   calculating a fuzzy gain value from said delta duty cycle and a correction term;
   calculating a duty cycle value from an integral gain value and said fuzzy gain value; and
   controlling said valve of said cam phaser based on said duty cycle value.

2. The method of claim 1 further comprising calculating said correction term based on engine oil temperature and engine speed.

3. The method of claim 1 wherein said step of calculating a fuzzy gain value further comprises multiplying said delta duty cycle by a first selectable scalar value if an absolute value of said position error is greater than a second selectable scalar value.

4. The method of claim 1 further comprising calculating said position error from a measured cam phaser position and a desired cam phaser position.

5. The method of claim 1 further comprising calculating said error dot from said position error and a previous position error.

6. The method of claim 1 wherein said position error and said error dot can be at least one of negative medium, negative small, zero, positive small, and positive medium.

7. The method of claim 1 wherein said step of controlling said valve further comprises:
   converting said duty cycle value to a signal; and
   controlling said valve based on said signal.

8. The method of claim 7 wherein said signal is a pulse width modulated signal.

9. A cam phaser control system, comprising:
   a fuzzy gain module that calculates a position error of said cam phaser, an error dot and a fuzzy gain value using fuzzy logic;
   an integral gain module that determines an integral gain value based on said position error; and
   a fuzzy duty cycle module that calculates a duty cycle value based on said fuzzy gain value and said integral gain value.

10. The system of claim 9 wherein said fuzzy gain module determines a delta duty cycle from said position error and said error dot.

11. The system of claim 10 wherein said fuzzy gain module multiplies said delta duty cycle by a selectable scalar value if the absolute value of said position error is greater than a selectable scalar value.

12. The system of claim 9 wherein said fuzzy gain module calculates a position error from a measured position and desired position.

13. The system of claim 12 wherein said fuzzy gain module calculates an error dot from said position error and a previous position error.

14. The system of claim 10 wherein said fuzzy gain module multiplies said delta duty cycle by a correction term, wherein said correction term is determined by an engine oil temperature and an engine speed.

15. The system of claim 9 wherein said fuzzy duty cycle module converts said duty cycle value into a signal capable of commanding a variable current for a fixed impedance.

16. The system of claim 15 further comprising a valve that is controlled by said signal.

* * * * *